US009372597B2

(12) United States Patent
Wait (10) Patent No.: US 9,372,597 B2
(45) Date of Patent: Jun. 21, 2016

(54) APPLIANCE SYSTEMS PROVIDING USER-FRIENDLY SHARED MUSIC PLAYLIST EDITING (71) Applicant: General Electric Company, Schenectady, NY (US)

(72) Inventor: Keith Wesley Wait, Louisville, KY (US)

(73) Assignee: General Electric Company, Schenectady, NY (US)

( * ) Notice: Subject to any disclaimer, the term of this patent is extended or adjusted under 35 U.S.C. 154(b) by 300 days.

(21) Appl. No.: 14/153,549

(22) Filed: Jan. 13, 2014

(65) Prior Publication Data
US 2015/0200977 A1  Jul. 16, 2015

(51) Int. Cl.
*G06F 15/16* (2006.01)
*G06F 3/0482* (2013.01)
*H04L 29/06* (2006.01)

(52) U.S. Cl.
CPC .......... *G06F 3/0482* (2013.01); *H04L 63/0846* (2013.01); *H04L 65/4084* (2013.01)

(58) Field of Classification Search
USPC ........................................................ 709/219
See application file for complete search history.

(56) References Cited

U.S. PATENT DOCUMENTS

| | | | | |
|---|---|---|---|---|
| 8,826,135 B1* | 9/2014 | Durham | ................... | H04N 1/00 715/716 |
| 9,112,849 B1* | 8/2015 | Werkelin Ahlin | ....... | H04L 63/08 |
| 9,165,322 B2* | 10/2015 | Nathan | ................ | G06Q 20/123 |
| 2005/0149480 A1* | 7/2005 | Deshpande | ....... | G06F 17/30067 |
| 2006/0067173 A1* | 3/2006 | Berkheimer | ...... | G06F 17/30749 369/30.06 |
| 2006/0173974 A1* | 8/2006 | Tang | ..................... | H04L 63/029 709/217 |
| 2006/0248557 A1* | 11/2006 | Stark | .................. | H04N 21/4126 725/37 |
| 2006/0253782 A1* | 11/2006 | Stark | ................. | G06F 17/30053 715/727 |
| 2006/0253874 A1* | 11/2006 | Stark | ....................... | G06F 3/038 725/62 |
| 2007/0005963 A1* | 1/2007 | Eldar | .................. | G06F 21/6209 713/168 |
| 2007/0089174 A1* | 4/2007 | Bader | ..................... | G06F 21/10 726/32 |
| 2008/0005179 A1* | 1/2008 | Friedman | .......... | G06F 17/30749 |
| 2008/0019516 A1* | 1/2008 | Fransdonk | ........... | H04N 7/1675 380/201 |
| 2008/0257134 A1* | 10/2008 | Oppenheimer | ... | G06F 17/30772 84/609 |

(Continued)

OTHER PUBLICATIONS

Smith, Andrea. "This Bluetooth Fridge Will Stream Your Music", Mashable, Jan. 8, 2013 <http://mashable.com/2013/01/08/bluetooth-fridge-streams/>.

*Primary Examiner* — Alicia Baturay
(74) *Attorney, Agent, or Firm* — Dority & Manning, P.A.

(57) ABSTRACT

Appliance systems providing user-friendly shared music playlist editing are provided. An example method of operating an appliance includes identifying a plurality of audio files accessible by the appliance over one or more local area networks. The method includes uploading data identifying the plurality of audio files to a server. The method includes providing an access code to a user computing device. The access code allows the user computing device to communicate with the server to select one or more of the plurality of audio files for playback. The method includes receiving from the server data identifying a first audio file selected for playback. The method includes causing one or more speakers to play the first audio file.

20 Claims, 7 Drawing Sheets

(56) References Cited

U.S. PATENT DOCUMENTS

| | | | |
|---|---|---|---|
| 2009/0042508 A1* | 2/2009 | Wakasa | G06Q 10/00 455/3.06 |
| 2009/0043783 A1* | 2/2009 | Wakasa | G06F 17/30017 |
| 2009/0056525 A1* | 3/2009 | Oppenheimber | G06F 17/30743 84/609 |
| 2009/0077610 A1* | 3/2009 | White | H04N 7/173 725/131 |
| 2009/0089401 A1* | 4/2009 | Zhang | G06F 17/30867 709/218 |
| 2009/0327035 A1* | 12/2009 | Allard | G06Q 10/00 705/7.29 |
| 2010/0114979 A1* | 5/2010 | Petersen | G06F 17/30053 707/803 |
| 2011/0314388 A1* | 12/2011 | Wheatley | G11B 27/034 715/751 |
| 2012/0079577 A1* | 3/2012 | Hao | H04L 63/10 726/7 |
| 2012/0158531 A1 | 6/2012 | Dion et al. | |
| 2012/0199643 A1* | 8/2012 | Minnick | G06F 17/30879 235/375 |
| 2012/0233120 A1* | 9/2012 | Nijim | G06F 17/30828 707/626 |
| 2012/0284423 A1* | 11/2012 | Weel | H04L 67/10 709/231 |
| 2012/0311723 A1* | 12/2012 | Britt, Jr. | G06F 17/30023 726/28 |
| 2013/0043973 A1* | 2/2013 | Greisen | G07C 9/00571 340/5.51 |
| 2013/0124533 A1* | 5/2013 | Yadav | G06F 17/30 707/748 |
| 2013/0254663 A1* | 9/2013 | Bates | G06F 3/0481 715/716 |
| 2013/0262616 A1* | 10/2013 | Kim | H04L 29/08549 709/214 |
| 2013/0283393 A1* | 10/2013 | Hierro | G06F 21/10 726/27 |
| 2013/0343567 A1* | 12/2013 | Triplett | H04N 21/41407 381/77 |
| 2013/0347022 A1* | 12/2013 | Bates | H04N 21/25816 725/25 |
| 2014/0074924 A1* | 3/2014 | Yim | H04N 21/43637 709/204 |
| 2014/0075582 A1* | 3/2014 | Hierro | H04L 63/123 726/30 |
| 2014/0115461 A1* | 4/2014 | Reznor | G06Q 30/0631 715/716 |
| 2014/0115462 A1* | 4/2014 | Reznor | H04M 1/72522 715/716 |
| 2015/0031289 A1* | 1/2015 | Agarwal | H04W 4/008 455/41.1 |
| 2015/0295763 A1* | 10/2015 | Yu | H04L 41/08 726/4 |
| 2015/0339698 A1* | 11/2015 | Gallagher | G06Q 30/02 705/14.13 |

* cited by examiner

APPLIANCE SYSTEMS PROVIDING USER-FRIENDLY SHARED MUSIC PLAYLIST EDITING

FIELD OF THE INVENTION

The present disclosure relates generally to appliances. More particularly, the present disclosure is directed to appliances and associated systems that provide for user-friendly playlist editing and playback of music shared across one or more local networks.

BACKGROUND OF THE INVENTION

Home kitchens have long been a center of activity in a household. For example, cooking, eating, drinking, socializing and other group activities often occur in or around the kitchen. As such, kitchen designers have recognized that consumers desire a kitchen which provides features that make the consumers' presence in or around the kitchen more comfortable or pleasing.

Furthermore, due to recent advancements in technology, home appliances are increasingly including "smart" features that are capable of performing intelligent or complex tasks in addition to their traditional functionality.

The challenge then, is to provide advanced appliance features that enhance the natural social atmosphere of the kitchen without burdening the occupants with onerous interaction with the technology.

As an example, consumers may desire to have music playing in the background while kitchen tasks occur or while a group of persons eat or drink together in the kitchen. For example, consumers may desire to allow multiple persons (e.g. guests at a party) to collectively control or contribute to a playlist of music playing at the party.

However, allowing multiple persons to control the playlist can be a complex or time-consuming task. For example, certain existing systems may require each guest to operate the host's audio equipment. For guests that have never interacted with such equipment this can be confusing and require instruction, distracting the host from entertaining the other guests.

As another example, certain existing systems may allow various persons to interact with the host's audio equipment using their own respective devices (e.g. tablets or smartphones). However, such systems may require each guest to log-on to the home owner's home wireless network. Therefore, manual entry of a network name and password is likely required. Manual entry of network information can be time consuming, tedious, and prone to error. In addition, for certain hosts it may be undesirable to allow guests to access their home network.

Therefore, a need exists for appliance systems providing user-friendly shared music playlist editing and playback.

BRIEF DESCRIPTION OF THE INVENTION

Additional aspects and advantages of the invention will be set forth in part in the following description, or may be apparent from the description, or may be learned through practice of the invention.

One aspect of the present disclosure is directed to a method for operating an appliance. The method includes identifying a plurality of audio files accessible by the appliance over one or more local area networks. The method includes uploading data identifying the plurality of audio files to a server. The method includes providing an access code to a user computing device. The access code allows the user computing device to communicate with the server to select one or more of the plurality of audio files for playback. The method includes receiving from the server data identifying a first audio file selected for playback. The method includes causing one or more speakers to play the first audio file.

Another aspect of the present disclosure is directed to a system. The system includes an appliance and a server accessible by the appliance over a wide area network. The appliance is configured to perform appliance operations. The appliance operations include identifying a plurality of audio files accessible by the appliance over one or more local area networks. The appliance operations include sending data identifying the plurality of audio files to the server. The appliance operations include providing an access code to a user computing device. The appliance operations include receiving from the server data identifying a first audio file. The appliance operations include streaming the first audio file for playback via one or more speakers. The server is configured to perform server operations. The server operations include receiving the access code from the user computing device and identifying the appliance based at least in part on the access code. The server operations include providing a playlist management interface to the user computing device. The playlist management interface allows the user computing device to specify one or more of the plurality of audio files. The server operations include sending to the appliance the data identifying the first audio file.

Another aspect of the present disclosure is directed to an appliance. The appliance includes a network resource management module configured to identify a plurality of audio files accessible by the appliance over one or more local networks. The appliance includes an access code generation module configured to generate an access code. The appliance includes a data transmitter configured to transmit the access code to a user computing device. The access code permits the user computing device to interface with a server to manage a playlist. The appliance receives data from the server indicating one or more of the plurality of audio files included in the playlist and accesses the one or more of the plurality of audio files over the one or more local networks to play the one or more of the plurality of audio files.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
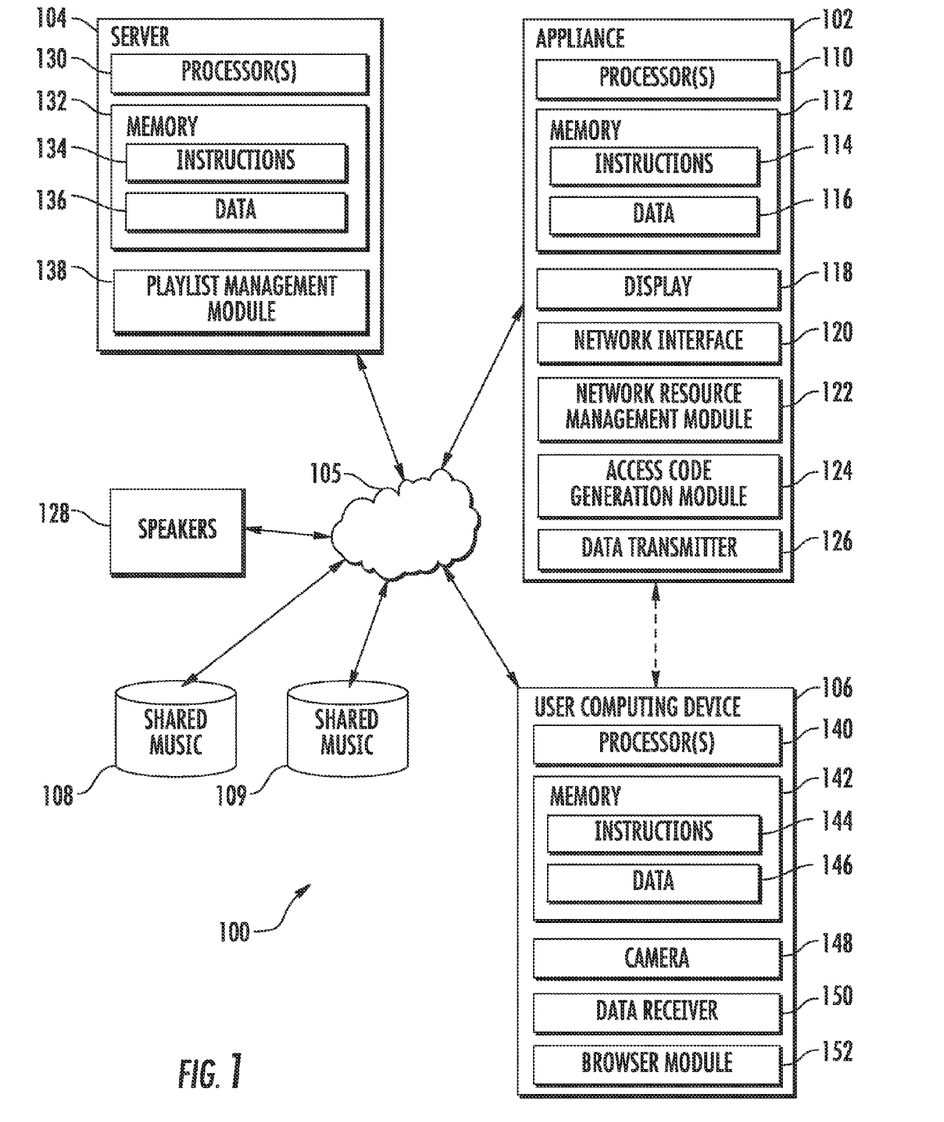
FIG. 1 depicts an exemplary system for providing user-friendly shared music playlist editing according to an exemplary embodiment of the present disclosure.

FIG. 1 depicts an exemplary system 100 for providing user-friendly shared music playlist editing according to an exemplary embodiment of the present disclosure. In particular, system 100 can include an appliance 102 in communication with server 104 over a network 105.

Appliance 102 can be any suitable type of appliance, including, but not limited to, a dishwasher, a microwave, a washing machine, a dryer, an oven, a refrigerator, an ice machine, a heater, or any other type of appliance.

Appliance 102 can include one or more processors 110, a memory 112, a display 118, and a network interface 120. The processor(s) 110 can be any suitable processing device, such as a microprocessor, microcontroller, integrated circuit, or other suitable processing device.

The memory 112 can include any suitable storage media, including, but not limited to, non-transitory computer-readable media, RAM, ROM, hard drives, flash drives, accessible databases, or other memory devices. The memory 112 can store information accessible by processor(s) 110, including instructions 114 that can be executed by processor(s) 110 to control various components of appliance 102 to provide appliance functionality. Memory 112 can also store various forms of other data 116.

Display 118 can be any display for displaying information from appliance 102 to a user or a user computing device. As examples, display 118 can be a liquid crystal display or an LED display.

Network interface 120 can include any suitable components for interfacing with one more networks, such as network 105. As examples, network interface 120 can include transmitters, receivers, ports, controllers, antennas, or other suitable components.

According to an aspect of the present disclosure, appliance 102 can further include a network resource management module 122. In particular, appliance 102 can implement network resource management module 122 to discover, manage, and communicate with one or more network resources.

As an example, network resource management module 122 can be implemented to identify various sources of shared music, such as shared databases 108 and 109. For example, shared databases 108 and 109 can be music shared by one or more computing devices that are accessible by appliance 102 over one or more local area networks. Appliance 102 can implement network resource management module 122 to identify available shared music according to a periodic interval, whenever one or more previously un-indexed network resources become apparent, and/or upon the occurrence of various appliance operations (e.g. entry of the appliance into a "party mode").

As examples, shared databases 108 and 109 can be a memory card or flash card such as a Secure Digital card or Universal Serial Bus flash drive that is connected a port or interface of appliance 102. As another example, shared databases 108 and 109 can be a computing device (e.g. laptop, desktop, tablet, music player, or smartphone) hard drive or other data storage device that is shared over network 105 and accessible by network resource management module 122.

Generally, shared music databases 108 and 109 can represent any source of shared music or audio files that is accessible to appliance 102. Further, while the term "shared music" is used herein, it will be understood that the systems and methods of the present disclosure can advantageously be applied to many different forms of media content in addition to music, including, for example, any form of audio/visual content.

It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

As an example, network resource management module 122 can act as a Universal Plug and Play (UPnP) media server control point to discover and stream shared music 108 and 109. In particular, various other computing devices associated with network 105 can act as a UPnP media server to provide media library information and streaming. Network resource management module 122 can act as a UPnP to browse (e.g. identify) the media content provided by the media server and request that the media server deliver a file to appliance 102 for playback.

As another example, network resource management module 122 can identify available shared music 108 and 109 by acting as a common internet file system (CIFS) or server message block (SMB) client to query a master browser for a list of available file shares on network 105. For example, one of more computing devices implementing a Windows-based operating system can perform operations to act as a master browser to aggregate information concerning available network resources. Appliance 102 can act as a client of such master browser to request information concerning available audio files.

Alternatively or additionally to a CIFS system, shared music 108 and 109 may be part of a distributed file system or a network file system operated by one or more computing devices implementing Linux-based operating systems.

As yet another example, network resource management module 122 can identify available shared music by communicating with various devices associated with network 105 using Digital Audio Access Protocol (DAAP) or AirPlay. For example, a music library management software program running on one or more computing devices associated with network 105 can act as a server that streams audio files according to DAAP or AirPlay. Network resource management module 122 can act as a client to request and receive metadata and streaming for playblack.

As another example, network resource management module 122 can perform zero-configuration networking (zeroconf) to locate all devices that advertise files shares as an available service and then index them. When new zeroconf devices come online, they can be automatically recognized and indexed by network resource management module 122.

As yet another example, network resource management module 122 identify available shared music by scanning available network resources, such as, for example, the hard disk drives of networked computing devices, for files having an audio file type.

As another example, network resource management module 122 can be configured to receive credentials to an online music locker or storage space from a user computing device 106 or via a user interface of appliance 102. The appliance 102 can sign-in to or other access the music locker using the credentials to identify and/or stream available audio files.

According to another aspect of the present disclosure, appliance 102 can upload information to server 104 that identifies or otherwise lists all available shared music resources. For example, the information can be metadata (e.g. artist, title, genre, year, etc.) or a filename for each available audio file. In some implementations, appliance 102 can implement network resource management module 122 to perform such operations.

Thus, appliance 102 can make known to server 104 all of the audio files which are available for appliance 102 to stream or otherwise obtain for playback. Therefore, server 104 can store information concerning a library of music available to appliance 102, but does not necessarily store the content itself.

According to yet another aspect of the present disclosure, appliance 102 can include an access code generation module 124. Appliance 102 can implement access code generation module 124 to generate an access code to provide to one or more user computing devices 106.

The access code can allow one or more user computing device(s) 106 to communicate with server 104 to manage or modify a playlist of music to be played by appliance 102. In addition, while user computing device 106 is shown as connected to server 104 and appliance 102 over network 105, user computing device 106 is not necessarily required to join a home WiFi network to implement the present disclosure. For example, in some implementations, user computing device can receive the access code from the appliance 102 via data transmitter 126, as will be discussed further below, and then communicate with server 104 using a cellular data connection.

As an example, access code generation module 124 can be implemented to generate an access code in the form of a uniform resource locator. In some implementations, the uniform resource locator can include a username that identifies appliance 102 and/or a password. For example, in some implementations, the username can be a serial number of appliance 102.

As a further example, in instances in which the access code includes a password, access code generation module 124 can be configured to generate the password based at least in part on a hash of the current time, so that the generated access code provides one-time access for the user computing device 106 to communicate with the server 104. For example, a new password can be generated every 30 seconds or can be generated at the beginning of each unique session. Thus, server 104 can include similar or complimentary hashing functionality to determine the validity of a password based on a hash of the current time.

As another example, the access code can include instructions to be performed by user computing device 106. Thus, by implementing the instructions included in the access code, user computing device 106 may gain access to server 104.

According to another aspect of the present disclosure, in some implementations, appliance 102 can implement access code generation module 124 to encode the generated access code. For example, as will be discussed further below, the access code can be encoded into a barcode such as, for example, a QR code, or other machine-readable optical representation of data.

According to yet another aspect of the present disclosure, appliance 102 can include a data transmitter 126. Appliance 102 can operate data transmitter 102 to transmit one or more access codes to one or more user computing devices.

As an example, data transmitter 126 can be a near-field communication data transmitter, an infrared transmitter, or a generic radio frequency transmitter. As another example, data transmitter 126 can be a microprocessor and speaker that are configured to transmit the access code in the form of an audio signal, for example, similar to audio signals used to transmit data over telephone lines using a modem.

An yet another example, in some implementations, display 118 can be used to transmit the access code the user computing devices 106. Thus, display 118 can provide the data transmission functionality.

For example, as noted above, the access code can be encoded into a QR code. Therefore, the QR code can be displayed on display 118. User computing device 106 can include a camera, an application and/or other functionality to optically receive the QR code, decode the QR code, and then implement the access code.

Furthermore, other forms of optical data transmission can be used as well. For example, the access code can be provided as text on display 118 and the user computing device 106 can use the camera along with optical character recognition functionality to receive and recognize the access code.

Appliance 102 can include or otherwise be in communication with one or more speakers 128. Speakers 128 can be any device or component for generating sound. In some implementations, speakers 128 are integral to appliance 102. In other implementations, speakers 128 are remote to appliance 102 and communication from appliance 102 to speakers 128 occurs via a wired connection or a wireless connection such as, for example, over network 105, using the AirPlay protocol, using the Bluetooth protocol, using Universal Plug and Play technology, or via other wireless technologies.

Server 104 can be one computing device (e.g. a web server) or can be a plurality of computing devices operably connected. In particular, any computing functionality provided by server 104 can be performed by a plurality of computing devices arranged in a parallel or distributed computing system.

Server 104 can include one or more processors 130 and a memory 132. The processor(s) 130 can be any suitable processing device, such as a microprocessor, microcontroller, integrated circuit, or other suitable processing device.

The memory 132 can include any suitable storage media, including, but not limited to, non-transitory computer-readable media, RAM, ROM, hard drives, flash drives, accessible databases, or other memory devices. The memory 132 can store information accessible by processor(s) 130, including instructions 134 that can be executed by processor(s) 130 to control various components of server 132 to implement the present disclosure.

Memory 132 can also store various forms of other data 136. For example, data 136 can include metadata or other identifying information for each audio file accessible to appliance 102.

Further, although FIG. 1 depicts only a single appliance in communication with server 104, it will be appreciated that many different appliances (e.g. thousands of appliances) can be in communication with server 104. Server 104 can store data 136 for each of such appliances.

According to an aspect of the present disclosure, server 104 can include a playlist management module 138. Server 104 can implement playlist management module 138 to maintain and manage a playlist of music to be played by appliance 102.

In particular, playlist management module 138 can be implemented to provide a playlist management interface to a user computing device 106. The interface can allow user computing device 106 to manage or modify the playlist of music. Further, in some implementations, the playlist management interface can allow the user computing device 106 to upload a supplemental audio file to server 104. Thus, playlist management module 138 can be configured to receive user input or other interactions via the playlist management interface and respond accordingly.

User computing device 106 can be, for example, a computing device having a processor 140 and a memory 142, such as a wireless mobile device, a personal digital assistant (PDA), smartphone, tablet, laptop computer, desktop computer, music player, computing-enabled watch, computing-enabled eyeglasses, gaming console, embedded computing system, or other such devices/systems.

User computing device 106 can include one or more processors 140 and a memory 142. The processor(s) 140 can be any suitable processing device, such as a microprocessor, microcontroller, integrated circuit, or other suitable processing device.

The memory 142 can include any suitable storage media, including, but not limited to, non-transitory computer-readable media, RAM, ROM, hard drives, flash drives, accessible databases, or other memory devices. The memory 142 can store information accessible by processor(s) 140, including instructions 144 that can be executed by processor(s) 140 to control various components of user computing device 106 to implement the present disclosure. Memory 142 can also store various forms of other data 146.

User computing device 106 can also include a camera 148. Camera 148 can be any device or component for capturing images or other optical data. In some implementations, camera 148 can be used to view a QR code displayed by appliance 102 which encodes the access code for communicating with server 104.

According to another aspect of the present disclosure, user computing device 106 can also include a data receiver 150. In particular, data receiver can be any instrument or component for receiving data transmitted by data transmitted 126 of appliance 102. Therefore, in various implementations, data receiver 150 can be an audio receiver (e.g. microphone), an infrared receiver, a near-field communications receiver, a generic radio frequency receiver, or other components and associated processing functionality.

User computing device 106 can also include a browser module 152. Browser module 152 can be implemented to operate a web browsing application. In particular, user computing device 106 can implement the web browsing application to receive a playlist management interface from server 104.

For example, the web browsing application can visit or otherwise load a website associated with a uniform resource locator obtained from appliance 102. The website can provide a playlist management interface via which the user computing device can modify a playlist of audio files to be played by appliance 102. In some implementations, browser module 152 can be a dedicated application program designed for interaction with server 104.

Figure 2:
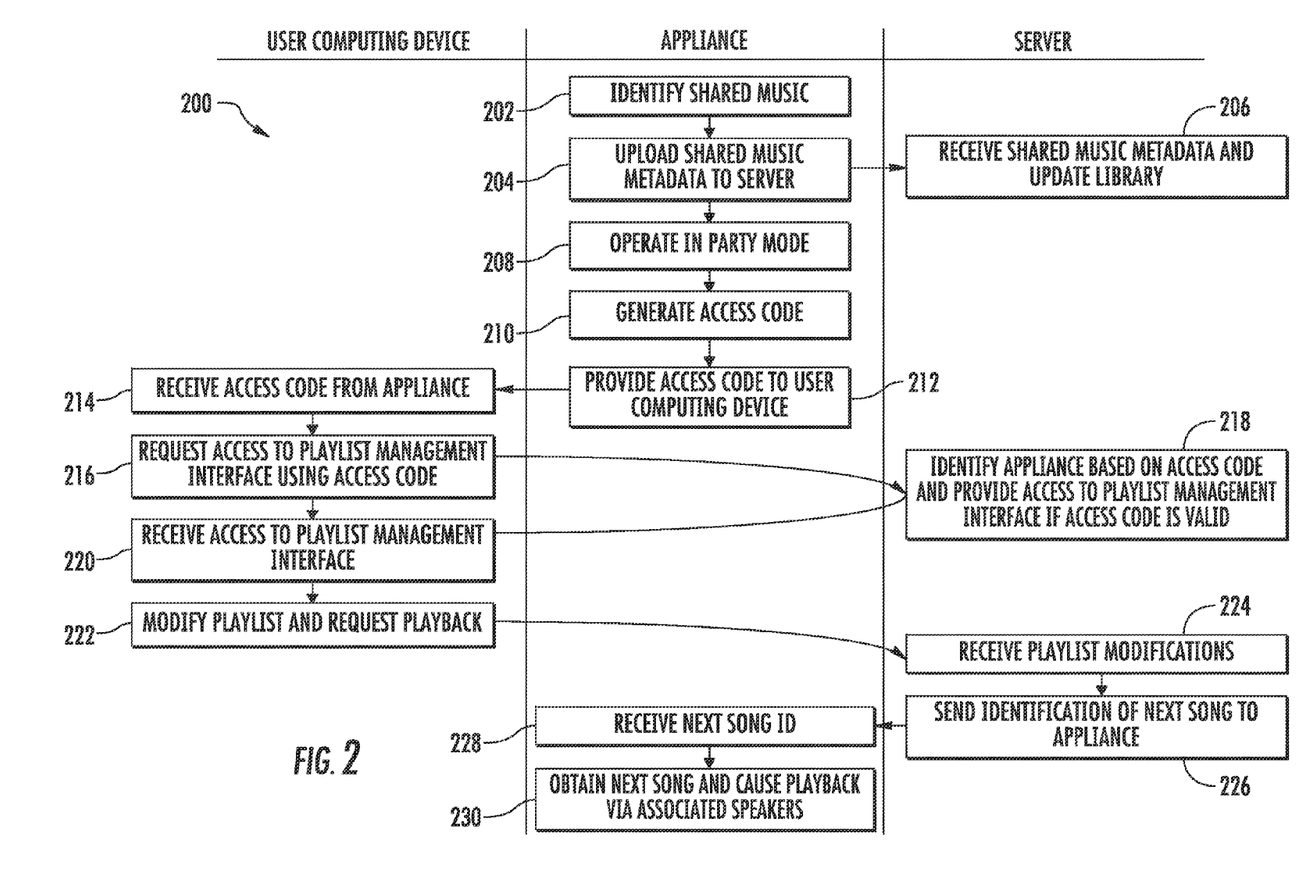
FIG. 2 depicts a flow chart of exemplary method for providing user-friendly shared music playlist editing according to an exemplary embodiment of the present disclosure.

FIG. 2 depicts a flow chart of an exemplary method (200) for providing user-friendly shared music playlist editing according to an exemplary embodiment of the present disclosure. Although method (200) will be discussed with reference to system 100 of FIG. 1, method (200) can be performed by any suitable appliance system.

In addition, FIG. 2 depicts steps performed in a particular order for purposes of illustration and discussion. Those of ordinary skill in the art, using the disclosures provided herein, will understand that the various steps method (200) can be omitted, adapted, and/or rearranged in various ways without departing from the scope of the present disclosure.

At (202) an appliance can identify one or more shared music files accessible by the appliance. For example, appliance 102 can implement network resource management module 122 to identify available shared music files.

At (204) the appliance can upload metadata identifying the shared music to a server. For example, appliance 102 can provide server 104 with metatdata or other information which identifies each audio file accessible by appliance 102. At (206) the server can receive the shared music metadata from the appliance and update a library associated with the particular appliance.

At (208) the appliance can begin operating in a party mode. For example, when operating in party mode, the appliance can request or automatically receive information from the server identifying the next song in a playlist. The party mode can be pre-scheduled or can be turned on by a user of the appliance via a user interface or via interaction between a user computing device and the server.

At (210) the appliance can generate an access code. For example, appliance 102 can implement access code generation module 124 to generate the access code.

At (212) the appliance can provide the access code to a user computing device. For example, appliance 102 can display the access code in the form of a QR code on display 118. As another example, appliance can operate data transmitter 126 to transmit the access code to a user computing device 106.

At (214) the user computing device can receive the access code from the appliance. For example, user computing device 106 can optically receive the QR code image and decode it to receive the access code. As another example, user computing device 106 can receive the access code using a data receiver 150.

At (216) the user computing device can communicate with the server to request access to a playlist management interface. In some implementations, the request can include the access code. For example, the access code can include or be included in a uniform resource locator used to guide a browser of user computing device 106. Thus, if the browser of user computing device 106 visits the uniform resource locator, then it can be provided with the playlist management interface. As another example, the access code may be used by a dedicated application of user computing device 106 to communicate with server 104.

At (218) the server can identify the appliance based at least in part on the access code and provide access to the playlist management interface if the access code provided by the user computing device is valid.

Thus, in some implementations, server 104 can perform credential validation at (218). For example, in some implementations in which the access code includes a password generated based on a hash of the current time, server 104 may perform a similar or complimentary hashing process at (218).

In other implementations, validating the access code can include checking the provided credentials against a username and password stored in a database. However, in some implementations, credential validation is not performed and simple possession of the access code (e.g. the URL) by user computing device 106 can be satisfactory to receive the playlist management interface.

At (220) the user computing device can receive access to the playlist management interface. For example, the playlist management interface can be loaded as a website by a browser of the user computing device 106. The playlist management interface can provide the ability to browse the library associated with appliance 102 and modify a playlist.

At (222) the user computing device can modify the playlist and can request playback. For example, an operator of the user computing device 106 can rearrange the playlist, make an addition to or subtraction from the playlist, upload a supplemental audio file to the playlist, and/or play, pause, stop, advance, retreat, or otherwise control the playlist.

At (224) the server can receive the playlist modification from the user computing device and perform operations to effectuate the requested modifications.

At (226) the server can send identification of the next song in the playlist to the appliance. In particular, the server can identify the title, artist, filename, and/or network location.

At (228) the appliance can receive the next song identification from the server. At (230) the appliance can obtain the next song and cause playback via one or more associated speakers. For example, the appliance can stream the song from its local network location for playback using integral speakers.

In such fashion, a user computing device can quickly and easily control and modify a playlist. In particular, simply by receiving the access code (e.g. reading the QR code) provided by the appliance, the user computing device will be able to communicate with the server and control the playlist. Therefore, user-friendly group control of a shared music playlist is provided.

Figure 3:
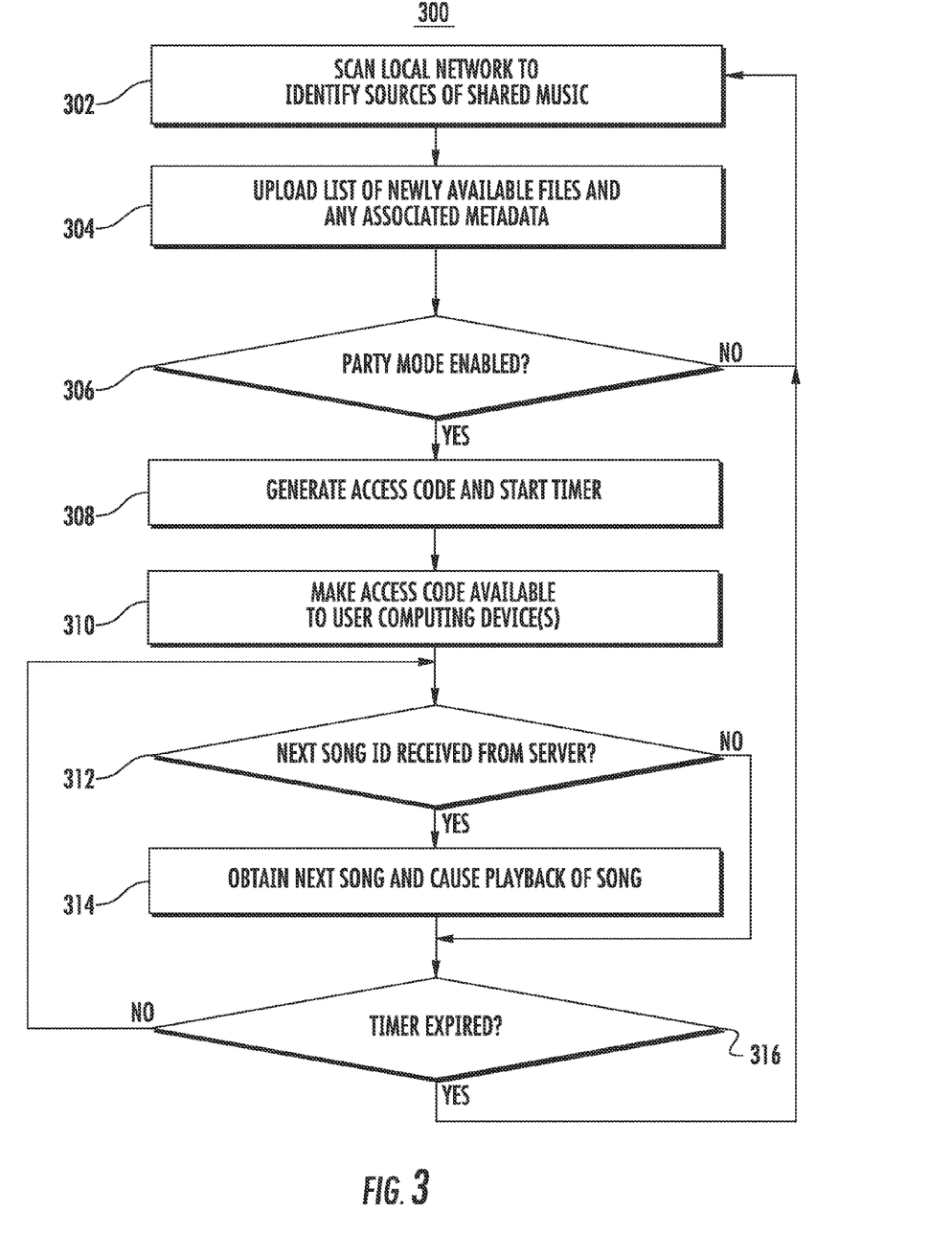
FIG. 3 depicts a flow chart of an exemplary method for operating an appliance according to an exemplary embodiment of the present disclosure.

FIG. 3 depicts a flow chart of an exemplary method (300) for operating an appliance according to an exemplary embodiment of the present disclosure. Method (300) can be performed by any suitable appliance.

In addition, FIG. 3 depicts steps performed in a particular order for purposes of illustration and discussion. Those of ordinary skill in the art, using the disclosures provided herein, will understand that the various steps method (300) can be omitted, adapted, and/or rearranged in various ways without departing from the scope of the present disclosure.

At (302) the appliance can scan one or more local networks to identify sources of shared music. For example, the appliance can identify shared music by acting as a UPnP media center control point, acting as a SMB client to query a master browser, scanning networked hard disks, identifying and indexing zeroconf devices, or other suitable methods.

At (304) the appliance can upload a list of newly available files and any associated metadata to a server. Thus, the appliance can periodically or on-demand scan the local networks for newly available (or newly unavailable) shared audio files and then provide an update to a server. Therefore, the server can maintain relatively accurate information describing a library of shared music accessible by the appliance.

At (306) the appliance can determine whether a party mode is enabled. In particular, when operating in party mode the appliance can actively communicate with the server to cause playback of audio files according to a playlist managed by the server. For example, party mode operation can be scheduled or can be toggled by a user of the appliance.

If it is determined at (306) that the appliance is not operating in party mode, then method (300) can return to (302) and again update the listing of its available shared music library. However, if it is determined at (306) that the appliance is operating in party mode, then method (300) can proceed to (308).

At (308) the appliance can generate an access code and start a timer. In particular, in some implementations, the appliance can periodically generate a new access code (e.g. every 30 seconds). Therefore once an access code has been generated, a time can be initialized to count down to the next generation of the access code.

At (310) the appliance can make the access code available to a user computing device. For example, at (310) the appliance can encode the access code as a QR code and display the QR code on a display of the appliance.

Figure 4:
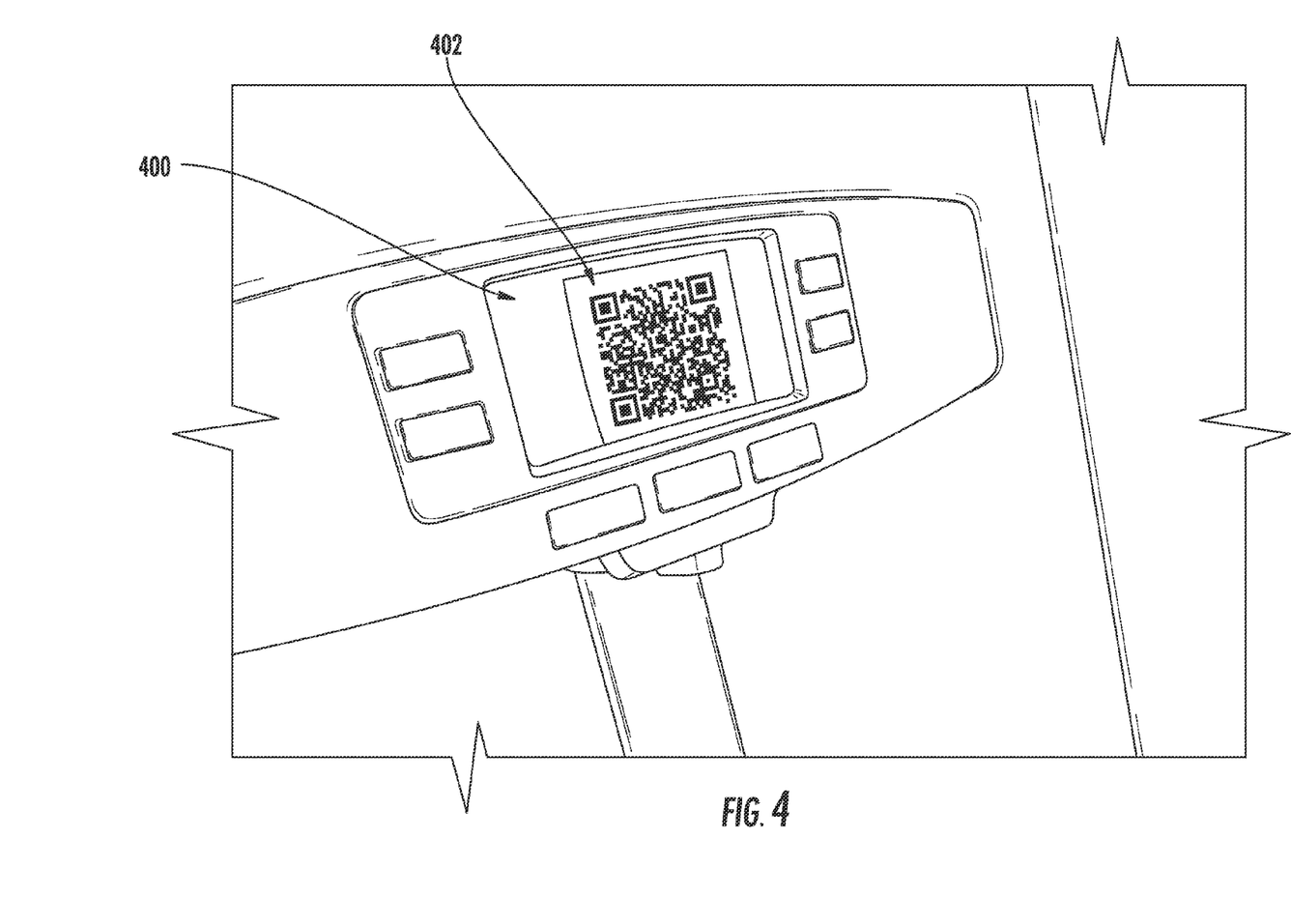
FIG. 4 depicts an exemplary appliance display according to an exemplary embodiment of the present disclosure.

As an example, FIG. 4 depicts an exemplary appliance display 400 according to an exemplary embodiment of the present disclosure. More particularly, shown on display 400 is a QR code 402 which encodes the access code generated at (308). In such fashion, one or more user computing devices that are in physical proximity the appliance will be able to receive the access code.

Referring again to FIG. 3, at (312) it can be determined whether identification of the next song has been received from the server. If the next song has been identified, then method (300) can proceed to (314). However, if the next song has not been identified, then method (300) can proceed to (316).

At (314) the appliance can obtain the next song and can cause playback of the song. For example, the identification of the song received from the server can specify a location of the song corpus (e.g. a local network location or located at the server). Therefore, at (314) the appliance can stream the song from its stored location and cause playback of the song via one or more associated speakers. After (314), method (300) can advance to (316).

At (316) it can be determined whether the timer has expired. It the timer has not expired, then method (300) can return to (312) and wait for the server to identify the next song.

However, if it is determined at (316) that the timer has expired, then method (300) can return to (302) and begin method (300) over again. Alternatively, if it is determined at (316) that the timer has expired, then method (300) can return to (308).

Further, it will be appreciated that, in some implementations, various steps of method (300) can be performed simultaneously or can be separated in plural independent and concurrent processes.

Figure 5:
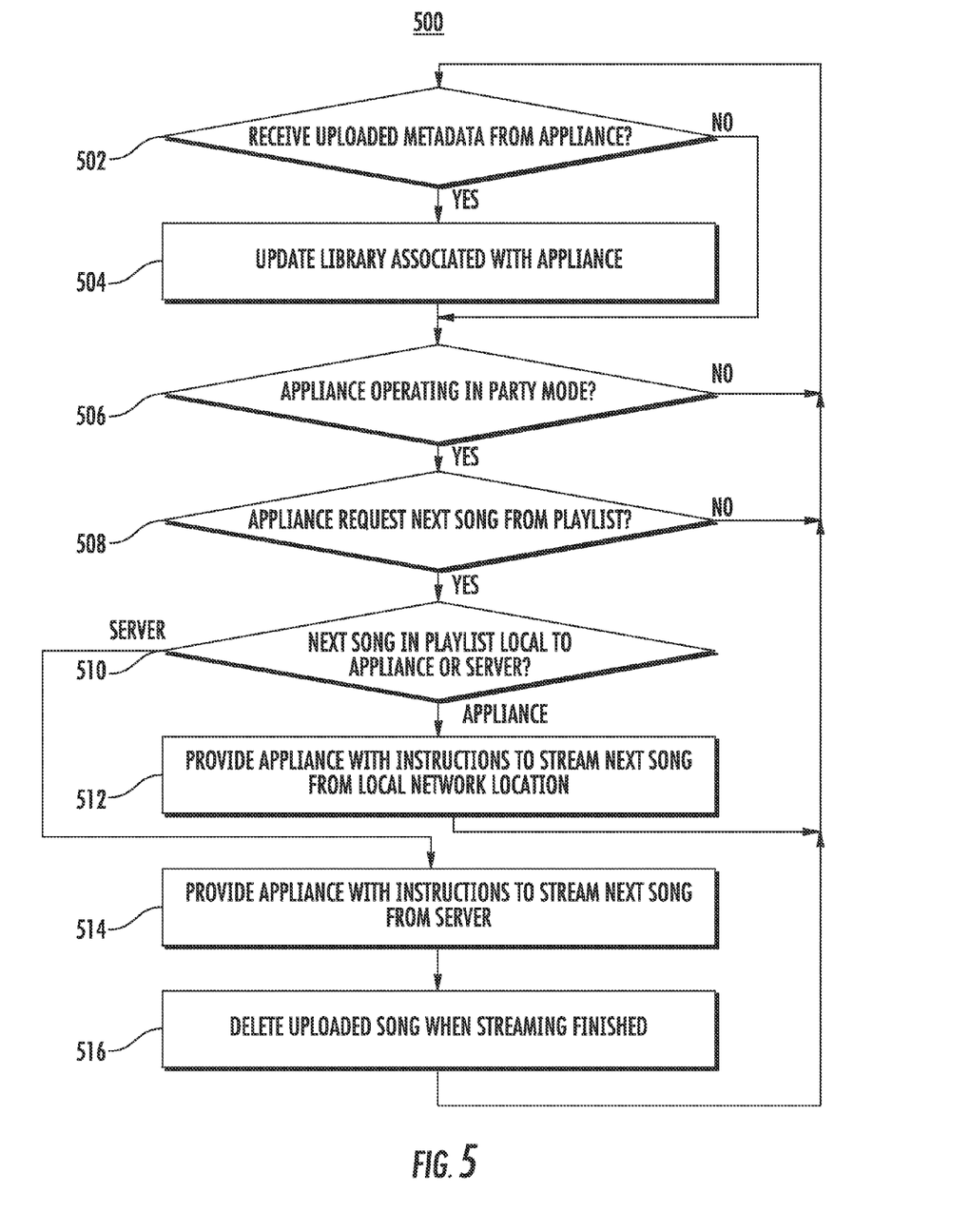
FIG. 5 depicts a flow chart of an exemplary method for operating a server according to an exemplary embodiment of the present disclosure.

FIG. 5 depicts a flow chart of an exemplary method (500) for operating a server according to an exemplary embodiment of the present disclosure. Method (500) can be performed by any suitable server or other computing device.

In addition, FIG. 5 depicts steps performed in a particular order for purposes of illustration and discussion. Those of ordinary skill in the art, using the disclosures provided herein, will understand that the various steps method (500) can be omitted, adapted, and/or rearranged in various ways without departing from the scope of the present disclosure.

At (502) the server can determined whether metadata has been received from an appliance. If it is determined that uploaded metadata has been received, then method (500) can proceed to (504). However, if it is determined that uploaded metadata has not been received, then method (500) can proceed to (506).

At (504) a library associated with the appliance can be updated based on the metadata received at (502). In particular, the library can index all shared music accessible by the appliance.

At (506) it can be determined whether the appliance is operating in party mode. For example, the server can query the appliance to determine whether the appliance is operating in party mode. As another example, the server can determine whether the appliance has recently informed the server of its status regarding operation in party mode.

As yet another example, the server can receive a prompt from a user computing device at (506) to toggle the appliance into the party mode and the server can respond by sending instructions to the appliance to switch into party mode.

If it is determined at (506) that the appliance is not operating in party mode, then method (500) can return to step (502). Furthermore, if the appliance had previously been operating in party mode and has now switched out of party mode, then, in some implementations, at (506) the server can end the playlist session, revoke any previous authorizations granted to user computing devices, and/or provide instructions to the appliance to end playback of music.

However, if it is determined at (506) that the appliance is operating in party mode, then method (500) can proceed to (510).

At (510) the server can determine whether the next song in the playlist is local to the appliance or is stored at the server. If the next song is local to the appliance then method (500) can proceed to (512).

At (512) the server can provide the appliance with instructions to stream the next song from the local network location. After (512), method (500) can return to (502) and begin method (500) again. Alternatively, after (512), method (500) can return to (506).

Returning to (510), if it is determined that the next song is stored at the server, then method (500) can proceed to (514).

At (514) the server can provide the appliance with instructions to stream the next song from the server.

At (516) the server can delete the uploaded song from its memory when the appliance has completed streaming of the song. In such fashion, users may be permitted to upload supplemental songs for the purposes of one-time streaming. After the single streaming, the song will be deleted, mitigating concerns regarding copyright law.

After (516), method (500) can return to (502) and begin method (500) again. Alternatively, after (516), method (500) can return to (506).

Figure 6:
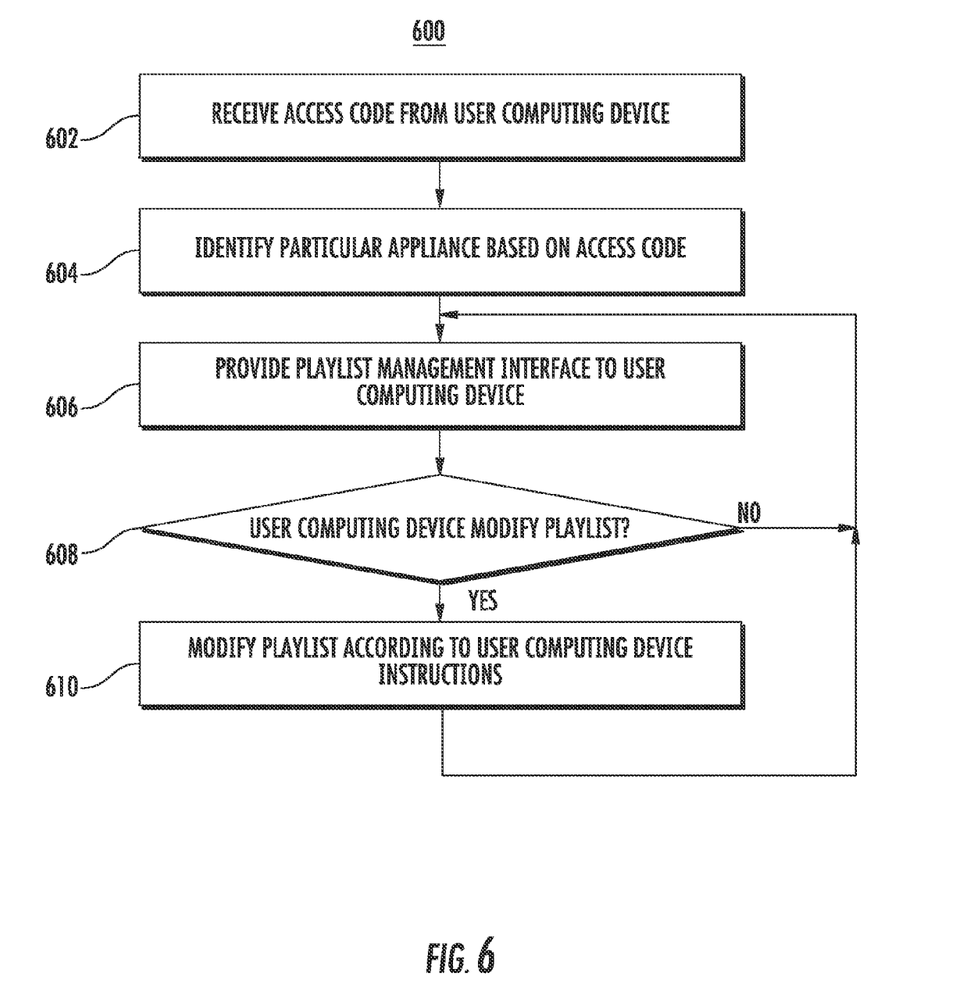
FIG. 6 depicts a flow chart of an exemplary method for operating a server according to an exemplary embodiment of the present disclosure.

FIG. 6 depicts a flow chart of an exemplary method (600) for operating a server according to an exemplary embodiment of the present disclosure. Method (600) can be performed by any suitable server or other computing device.

In addition, FIG. 6 depicts steps performed in a particular order for purposes of illustration and discussion. Those of ordinary skill in the art, using the disclosures provided herein, will understand that the various steps method (600) can be omitted, adapted, and/or rearranged in various ways without departing from the scope of the present disclosure.

At (602) the server can receive an access code from a user computing device. For example, receiving the access code at (602) can include receiving a request for website data associated with a particular URL. As another example, the access code can be provided as a log-in or other identification code.

At (604) the server can identify a particular appliance based on the access code. As an example, the access code can include a username associated with the particular appliance. For example, the username can be a serial number of the appliance.

At (606) the server can provide a playlist management interface to the user computing device. The playlist management interface can allow the user computing device to modify a playlist associated with the appliance identified at (604).

Figure 7:
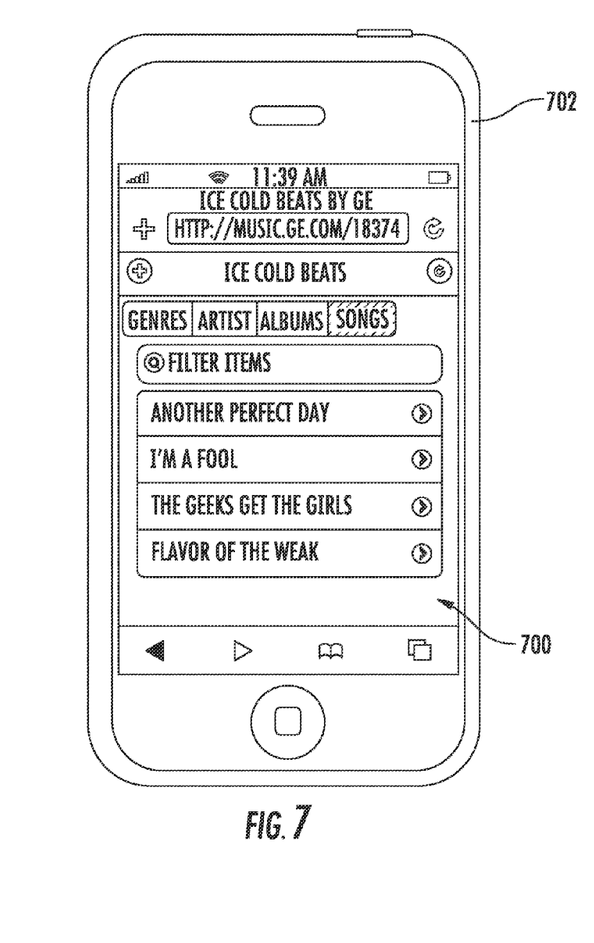
FIG. 7 depicts an exemplary playlist management interface according to an exemplary embodiment of the present disclosure.

As an example, FIG. 7 depicts an exemplary playlist management interface 700 according to an exemplary embodiment of the present disclosure. In particular, FIG. 7 depicts playlist management interface 700 displayed on the display of a user computing device 702.

As shown in FIG. 7, playlist management interface 700 can provide the opportunity to browse a library associated with the appliance by sorting available audio files by genre, artist, album, song title. The library can also be searched using a search string.

Other operations not depicted in FIG. 7, may be performed as well. Generally, it should be understood that playlist management interface 700 is exemplary in nature and not intended to limit the present disclosure. The present disclosure can be implemented using many different user interfaces which provide various features and functionality.

Referring again to FIG. 6, after the server provides the playlist management interface to the user computing device at (606), the server can determine at (608) whether the user computing device has provided data which requests a modification to the playlist.

If it is determined at (608) that the user computing device has not modified the playlist, then method (600) can return to (606) and continue providing the playlist management interface to the user computing device. However, if it is determined at (608) that the user computing device has modified the playlist, then method (600) can proceed to (610).

At (610) the server can modify the playlist according to instructions or requests received from the user computing device. As an example, the request from the user computing device may include instructions to play the next song, add a song to the playlist, or remove a song from the playlist. Thus, at (610) the server can effectuate the requested changes to the playlist.

As another example, if the user computing device requests to upload a supplemental song to the playlist, then at (610) the server can receive and store an uploaded copy of the supplemental song from the user computing device. After (610), method (600) can return to (606) and continue providing the playlist management interface to the user computing device.

Figure 8:
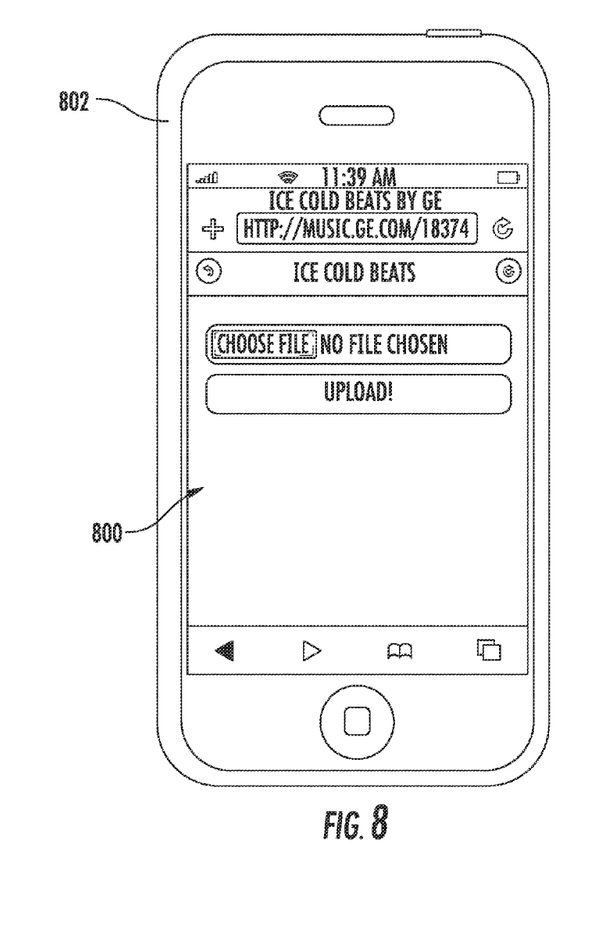
FIG. 8 depicts an exemplary playlist management interface according to an exemplary embodiment of the present disclosure.

As an example, FIG. 8 depicts an exemplary playlist management interface 800 according to an exemplary embodiment of the present disclosure. In particular, FIG. 8 depicts playlist management interface 800 displayed on the display of a user computing device 802.

As shown in FIG. 8, playlist management interface 800 can provide the opportunity to choose a file stored locally on user computing device 802 and upload the selected file to the server.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating an appliance, the method comprising:
   identifying a plurality of audio files accessible by the appliance over one or more local area networks;
   uploading data identifying the plurality of audio files to a server;
   providing an access code to a user computing device, wherein the access code allows the user computing device to communicate with the server to select one or more of the plurality of audio files for playback, wherein providing the access code to the user computing device comprises displaying a machine-readable optical representation of data on a display of the appliance, and wherein the machine-readable optical representation of data encodes the access code;
   receiving from the server data identifying a first audio file selected for playback; and
   causing one or more speakers to play the first audio file.

2. The method of claim 1, further comprising periodically generating the access code based at least in part on the hash of the current time such that the access code provides one-time access for the user computing device to communicate with the server.

3. The method of claim 1, wherein the access code comprises a uniform resource locator.

4. The method of claim 3, wherein the uniform resource locator includes a username associated with the appliance.

5. The method of claim 4, further comprising generating a password based at least in part on a hash of a current time, wherein the uniform resource locator further includes the password.

6. The method of claim 1, wherein identifying the plurality of audio files accessible by the appliance over the one or more local area networks comprises scanning one or more shared computer hard drives for files having an audio file format.

7. The method of claim 1, wherein identifying the plurality of audio files accessible by the appliance over the one or more local area networks comprises operating the appliance as a Universal Plug and Play media server control point.

8. The method of claim 1, wherein identifying the plurality of audio files accessible by the appliance over the one or more local area networks comprises operating the appliance as a common internet file system client to query a master browser.

9. The method of claim 1, wherein the data identifying the plurality of audio files comprises metadata identifying, for each of the plurality of audio files, an artist and a song title.

10. The method of claim 1, wherein causing the one or more speakers to play the first audio file comprises streaming the first audio file from its respective network location.

11. A method for operating an appliance, the method comprising:
   identifying a plurality of audio files accessible by the appliance over one or more local area networks;
   uploading data identifying the plurality of audio files to a server;
   providing an access code to a user computing device, wherein the access code allows the user computing device to communicate with the server to select one or more of the plurality of audio files for playback, wherein providing the access code to the user computing device comprises displaying text of the access code on a display of the appliance, wherein the user computing device receives the access code using optical character recognition;
   receiving from the server data identifying a first audio file selected for playback; and
   causing one or more speakers to play the first audio file.

12. The method of claim 11, further comprising periodically generating the access code based at least in part on the hash of the current time such that the access code provides one-time access for the user computing device to communicate with the server.

13. The method of claim 11, wherein the access code comprises a uniform resource locator.

14. The method of claim 13, wherein the uniform resource locator includes a username associated with the appliance.

15. The method of claim 14, further comprising generating a password based at least in part on a hash of a current time, wherein the uniform resource locator further includes the password.

16. The method of claim 11, wherein identifying the plurality of audio files accessible by the appliance over the one or more local area networks comprises scanning one or more shared computer hard drives for files having an audio file format.

17. The method of claim 11, wherein identifying the plurality of audio files accessible by the appliance over the one or more local area networks comprises operating the appliance as a Universal Plug and Play media server control point.

18. The method of claim 11, wherein identifying the plurality of audio files accessible by the appliance over the one or more local area networks comprises operating the appliance as a common internet file system client to query a master browser.

19. The method of claim 11, wherein the data identifying the plurality of audio files comprises metadata identifying, for each of the plurality of audio files, an artist and a song title.

20. The method of claim 11, wherein causing the one or more speakers to play the first audio file comprises streaming the first audio file from its respective network location.

* * * * *